(12) United States Patent
Tanaka et al.

(10) Patent No.: US 7,389,046 B1
(45) Date of Patent: Jun. 17, 2008

(54) SIMPLIFIED SWITCHING INTERCONNECT USING WAVELENGTH DIVISION MULTIPLEXING

(75) Inventors: Bert H. Tanaka, Saratoga, CA (US); Daniel J. Maltbie, Santa Cruz, CA (US)

(73) Assignee: Woven Systems, Inc., Sunnyvale, CA (US)

( * ) Notice: Subject to any disclaimer, the term of this patent is extended or adjusted under 35 U.S.C. 154(b) by 180 days.

(21) Appl. No.: 11/333,878

(22) Filed: Jan. 17, 2006

Related U.S. Application Data (60) Provisional application No. 60/644,974, filed on Jan. 18, 2005.

(51) Int. Cl.
*H04J 14/00* (2006.01)
(52) U.S. Cl. .................... 398/45; 398/49; 398/50; 398/56; 398/57
(58) Field of Classification Search ............ 398/45, 398/48–50, 55–57; 370/367, 370, 387, 397, 370/399
See application file for complete search history.

(56) References Cited

U.S. PATENT DOCUMENTS 7,000,026 B2 * 2/2006 Beshai et al. .............. 709/238
7,093,027 B1 * 8/2006 Shabtay et al. ............ 709/239

* cited by examiner

*Primary Examiner*—Dalzid Singh
(74) *Attorney, Agent, or Firm*—Bobby K. Truong; Hickman Palermo Truong & Becker LLP (57) ABSTRACT

A network of spine switches and leaf switches is disclosed wherein the spine switches and leaf switches are coupled using a simplified interconnect made up of multiple signal carrying media (SCM's). In the simplified interconnect, "virtual" links are used rather than physical links to couple the leaf switches to the spine switches. The virtual links are implemented using wavelength division multiplexing. By implementing virtual links, the network achieves the same connectivity as that provided by a Clos network without the complex interconnect that is typically required in a Clos network.

24 Claims, 7 Drawing Sheets

| Switch | Physical Links Used |
|---|---|
| Leaf Switch 102(1) | P1-P16 |
| Leaf Switch 102(2) | P17-P32 |
| Leaf Switch 102(3) | P33-P48 |
| Leaf Switch 102(4) | P49-P64 |
| Leaf Switch 102(5) | P65-P80 |
| Leaf Switch 102(6) | P81-P96 |
| Leaf Switch 102(7) | P97-P112 |
| Leaf Switch 102(8) | P113-P128 |
| Spine Switch S1 | P's 1, 17, 33, 49, 65, 81, 97, 113 |
| Spine Switch S2 | P's 2, 18, 34, 50, 66, 82, 98, 114 |
| Spine Switch S3 | P's 3, 19, 35, 51, 67, 83, 99, 115 |
| Spine Switch S4 | P's 4, 20, 36, 52, 68, 84, 100, 116 |
| Spine Switch S5 | P's 5, 21, 37, 53, 69, 85, 101, 117 |
| Spine Switch S6 | P's 6, 22, 38, 54, 70, 86, 102, 118 |
| Spine Switch S7 | P's 7, 23, 39, 55, 71, 87, 103, 119 |
| Spine Switch S8 | P's 8, 24, 40, 56, 72, 88, 104, 120 |
| Spine Switch S9 | P's 9, 25, 41, 57, 73, 89, 105, 121 |
| Spine Switch S10 | P's 10, 26, 42, 58, 74, 90. 106, 122 |
| Spine Switch S11 | P's 11, 27, 43, 59, 75, 91, 107, 123 |
| Spine Switch S12 | P's 12, 28, 44, 60, 76, 92, 108, 124 |
| Spine Switch S13 | P's 13, 29, 45, 61, 77, 93, 109, 125 |
| Spine Switch S14 | P's 14, 30, 46, 62, 78, 94, 110, 126 |
| Spine Switch S15 | P's 15, 31, 47, 63, 79, 95, 111, 127 |
| Spine Switch S16 | P's 16, 32, 48, 64, 80, 96, 112, 128 |

*Fig. 3*

| Switch | Virtual Links/Wavelengths Used |
|---|---|
| Leaf Switch 102(1) | $\lambda 1 - \lambda 16$ |
| Leaf Switch 102(2) | $\lambda 17 - \lambda 32$ |
| Leaf Switch 102(3) | $\lambda 33 - \lambda 48$ |
| Leaf Switch 102(4) | $\lambda 49 - \lambda 64$ |
| Leaf Switch 102(5) | $\lambda 65 - \lambda 80$ |
| Leaf Switch 102(6) | $\lambda 81 - \lambda 96$ |
| Leaf Switch 102(7) | $\lambda 97 - \lambda 112$ |
| Leaf Switch 102(8) | $\lambda 113 - \lambda 128$ |
| Spine Switch S1 | $\lambda$'s 1, 17, 33, 49, 65, 81, 97, 113 |
| Spine Switch S2 | $\lambda$'s 2, 18, 34, 50, 66, 82, 98, 114 |
| Spine Switch S3 | $\lambda$'s 3, 19, 35, 51, 67, 83, 99, 115 |
| Spine Switch S4 | $\lambda$'s 4, 20, 36, 52, 68, 84, 100, 116 |
| Spine Switch S5 | $\lambda$'s 5, 21, 37, 53, 69, 85, 101, 117 |
| Spine Switch S6 | $\lambda$'s 6, 22, 38, 54, 70, 86, 102, 118 |
| Spine Switch S7 | $\lambda$'s 7, 23, 39, 55, 71, 87, 103, 119 |
| Spine Switch S8 | $\lambda$'s 8, 24, 40, 56, 72, 88, 104, 120 |
| Spine Switch S9 | $\lambda$'s 9, 25, 41, 57, 73, 89, 105, 121 |
| Spine Switch S10 | $\lambda$'s 10, 26, 42, 58, 74, 90. 106, 122 |
| Spine Switch S11 | $\lambda$'s 11, 27, 43, 59, 75, 91, 107, 123 |
| Spine Switch S12 | $\lambda$'s 12, 28, 44, 60, 76, 92, 108, 124 |
| Spine Switch S13 | $\lambda$'s 13, 29, 45, 61, 77, 93, 109, 125 |
| Spine Switch S14 | $\lambda$'s 14, 30, 46, 62, 78, 94, 110, 126 |
| Spine Switch S15 | $\lambda$'s 15, 31, 47, 63, 79, 95, 111, 127 |
| Spine Switch S16 | $\lambda$'s 16, 32, 48, 64, 80, 96, 112, 128 |

SIMPLIFIED SWITCHING INTERCONNECT USING WAVELENGTH DIVISION MULTIPLEXING

PRIORITY INFORMATION

This application claims the benefit of U.S. Provisional Application Ser. No. 60/644,974, entitled A METHOD TO CREATE A LOGICAL MESH OVER A PHYSICAL RING IN A MULTISTAGE SWITCHING FABRIC, filed on Jan. 18, 2005, the contents of which are incorporated herein in their entirety by this reference.

BACKGROUND

Figure 1:
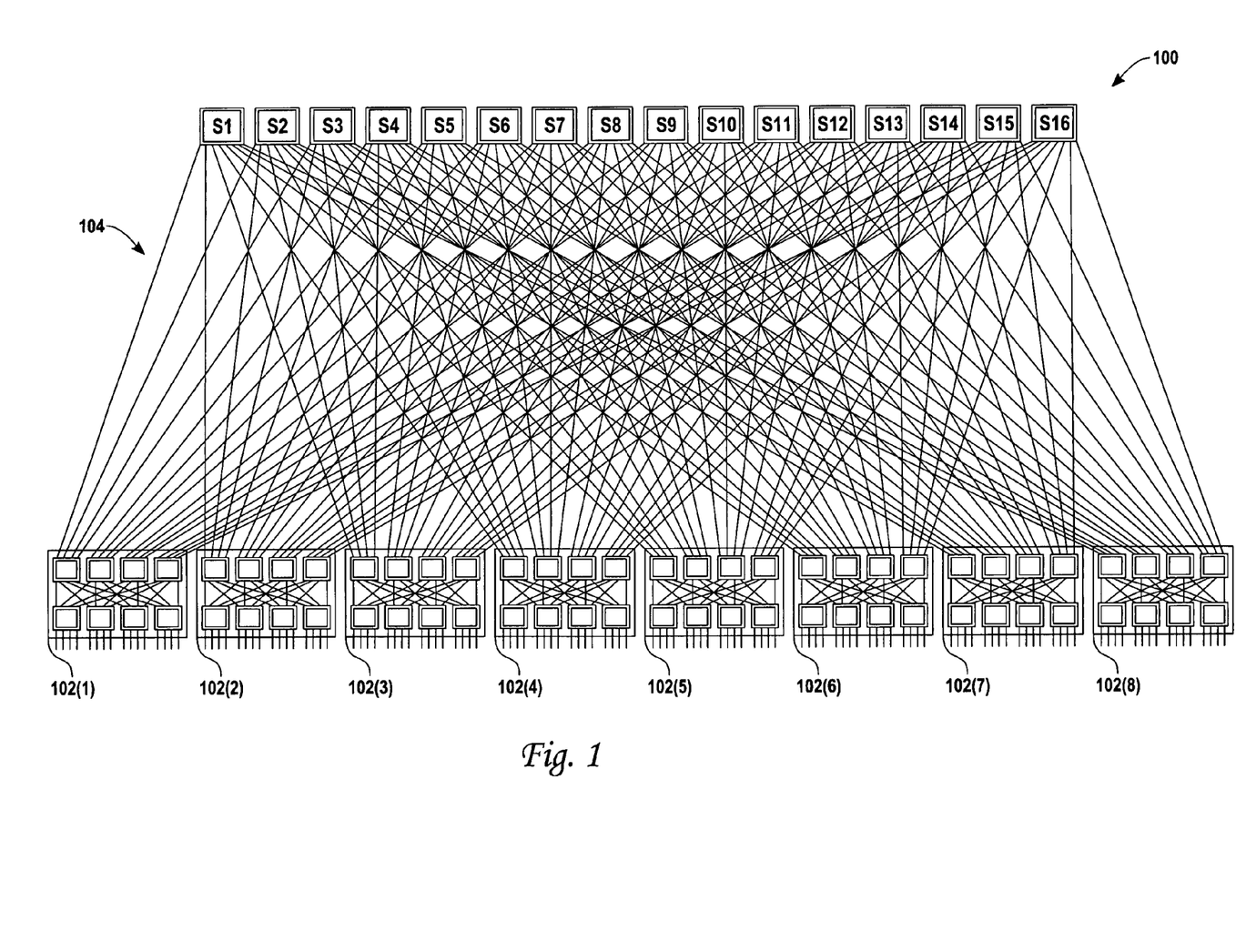
FIG. 1 shows a sample Clos network with a complex interconnect.

Many of today's multi-stage switching networks implement the well-known Clos switching architecture. An example of a Clos network is shown in FIG. 1, wherein the network 100 comprises a plurality of leaf switches 102 and a plurality of spine switches S1-S16. The ports of the leaf switches and the ports of the spine switches are interconnected by a spreader network 104 (also referred to as an interconnect). In the sample network shown in FIG. 1, each leaf switch 102 has sixteen inner ports (ports that are coupled to the spine switches) and sixteen outer ports (ports that can be coupled to external components, such as external computing nodes). Each leaf switch 102 may be implemented as a single switch, or, as shown in FIG. 1, may be implemented using a plurality of interconnected smaller switches (in the example shown, each leaf switch 102 is implemented with eight interconnected 8-port switches). In each leaf switch 102, information may be switched from any port of that leaf switch to any other port of that leaf switch. Similarly, in each spine switch S1-S16, information may be switched from any port of that spine switch to any other port of that spine switch.

Each inner port of a leaf switch 102 is coupled to a separate one of the spine switches S1-S16, as shown. With each leaf switch 102 having sixteen inner ports, and with sixteen spine switches S1-S16, there is a one-to-one relationship between an inner port of a leaf switch 102 and a spine switch. Likewise, each spine switch has eight ports. Each of these ports is coupled to a separate one of the leaf switches 102. With each spine switch having eight ports, and with eight leaf switches 102, there is a one-to-one relationship between a port of a spine switch and a leaf switch 102. Interconnected in this way, each leaf switch 102 may switch information to any one of the spine switches S1-S16. Likewise, each spine switch S1-S16 may switch information to any one of the leaf switches 102.

One of the advantages of a Clos network is that it has the desirable property of supporting full cross sectional bandwidth between all of the interconnected ports. This property ensures that there is sufficient capacity in the network to handle the traffic between all hosts regardless of the traffic pattern. One of the drawbacks of a Clos network, however, is that the complexity of the interconnect 104 can grow very rapidly. Even with the relatively small network shown in FIG. 1, one hundred twenty eight physical links are already required between the inner ports of the leaf switches 102 and the spine switches S1-S16. With a larger network having more switches and ports, the interconnect complexity would grow many fold. In fact, the complexity of the interconnect 104 would grow exponentially with the increase in switches and ports. That being the case, the cost of the interconnect 104 can quickly become a significant portion of the cost of the overall network. In addition, the increased complexity can make the interconnect 104 extremely difficult and costly to implement and manage. In light of these shortcomings, a need exists for an interconnect infrastructure that provides the same connectivity as that provided by the Clos interconnect but yet is simpler in structure and implementation.

DETAILED DESCRIPTION OF EMBODIMENT(S)

Single Ring Implementation

Figure 2:
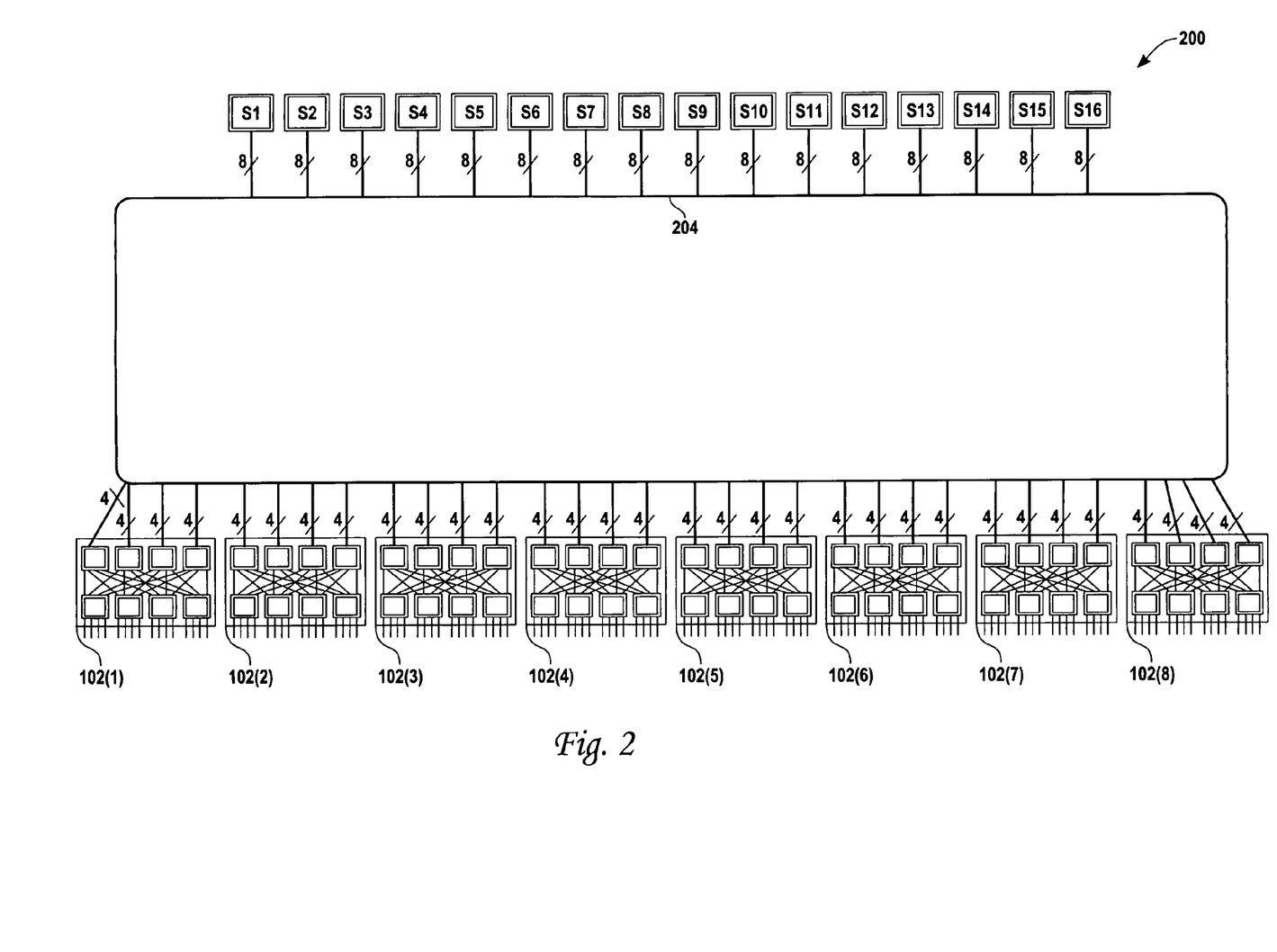
FIG. 2 shows a sample network in accordance with one embodiment of the present invention having a single signal carrying medium.

FIG. 2 shows one possible implementation in which the interconnect between the spine switches and the leaf switches is greatly simplified. In the network 200 of FIG. 2, the leaf switches 102 and spine switches S1-S16 are the same as those in FIG. 1, but the interconnect 104 is replaced by a single signal carrying medium (SCM) 204. For purposes of the present invention, the SCM 204 may take on any form, but in one embodiment, it is implemented as a set of one or more optical fiber rings. Each of the spine switches S1-S16 and each of the leaf switches 102 is coupled to the SCM 204, and the SCM 204 provides the physical medium for enabling the spine switches and leaf switches to communicate with each other.

Figure 3:
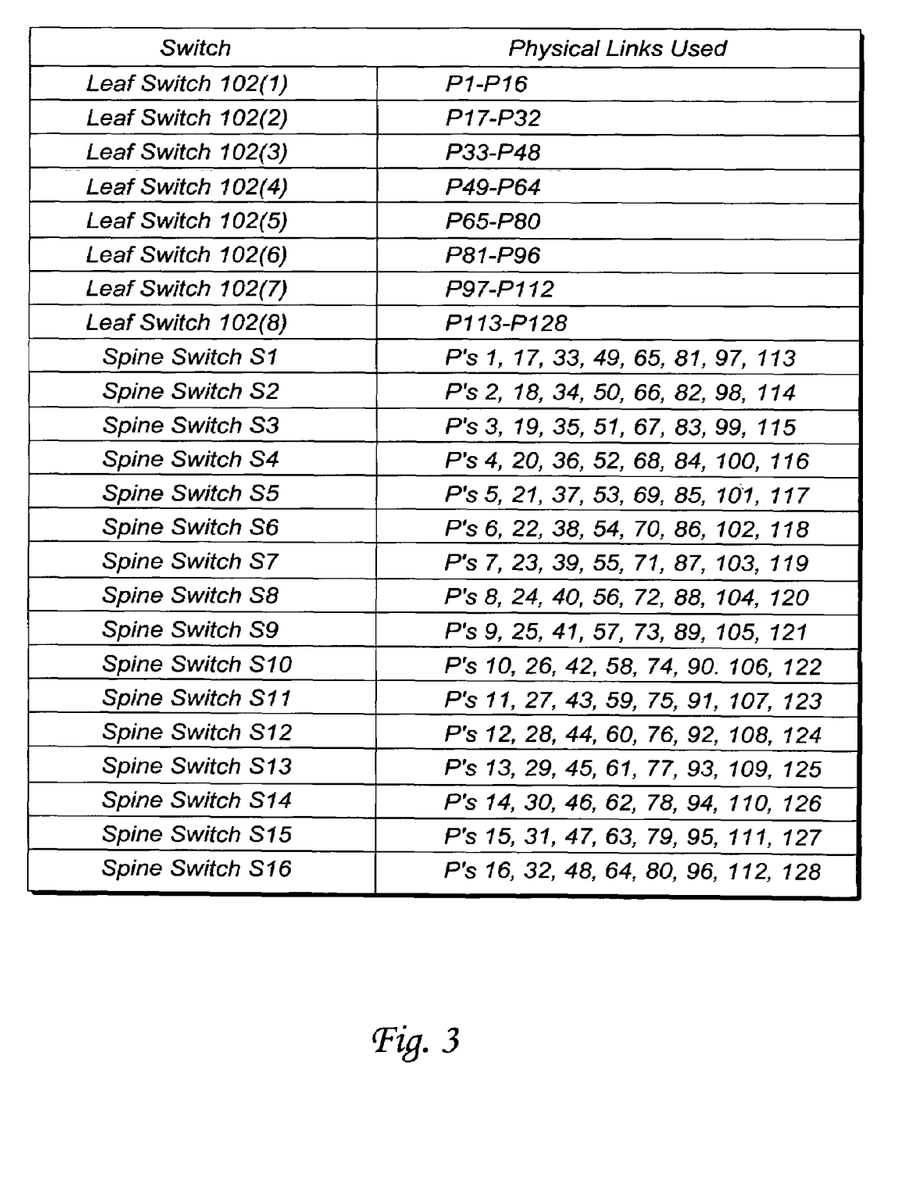
FIG. 3 shows a table summarizing the physical links used by each switch in the network of FIG. 1.

In the network 100 of FIG. 1, the leaf switches 102 are coupled to the spine switches S1-S16 through actual physical links. It is these physical links that enable the leaf switches and spine switches to communicate with specific other leaf switches and spine switches. For example, the leftmost physical link shown in FIG. 1 enables the first port of the first leaf switch 102(1) to exchange information with the first port of the first spine switch S1. In the interconnect 104 of FIG. 1, there are one hundred twenty eight physical links. Going from left to right, the first sixteen physical links (denoted herein as P1 through P16) are used by the inner ports of leaf switch 102(1), the next sixteen physical links (denoted as P17 through P32) are used by the inner ports of leaf switch 102(2), and so on such that the last sixteen physical links (denoted as P113 through P128) are used by the inner ports of leaf switch 102(8). FIG. 3 shows a table which summarizes the physical links used by the inner ports of each leaf switch 102. The table in FIG. 3 also shows the physical links used by each spine switch S1-S16.

In the network 200 of FIG. 2, connectivity between specific switches is not provided by actual physical links.

Figure 4:
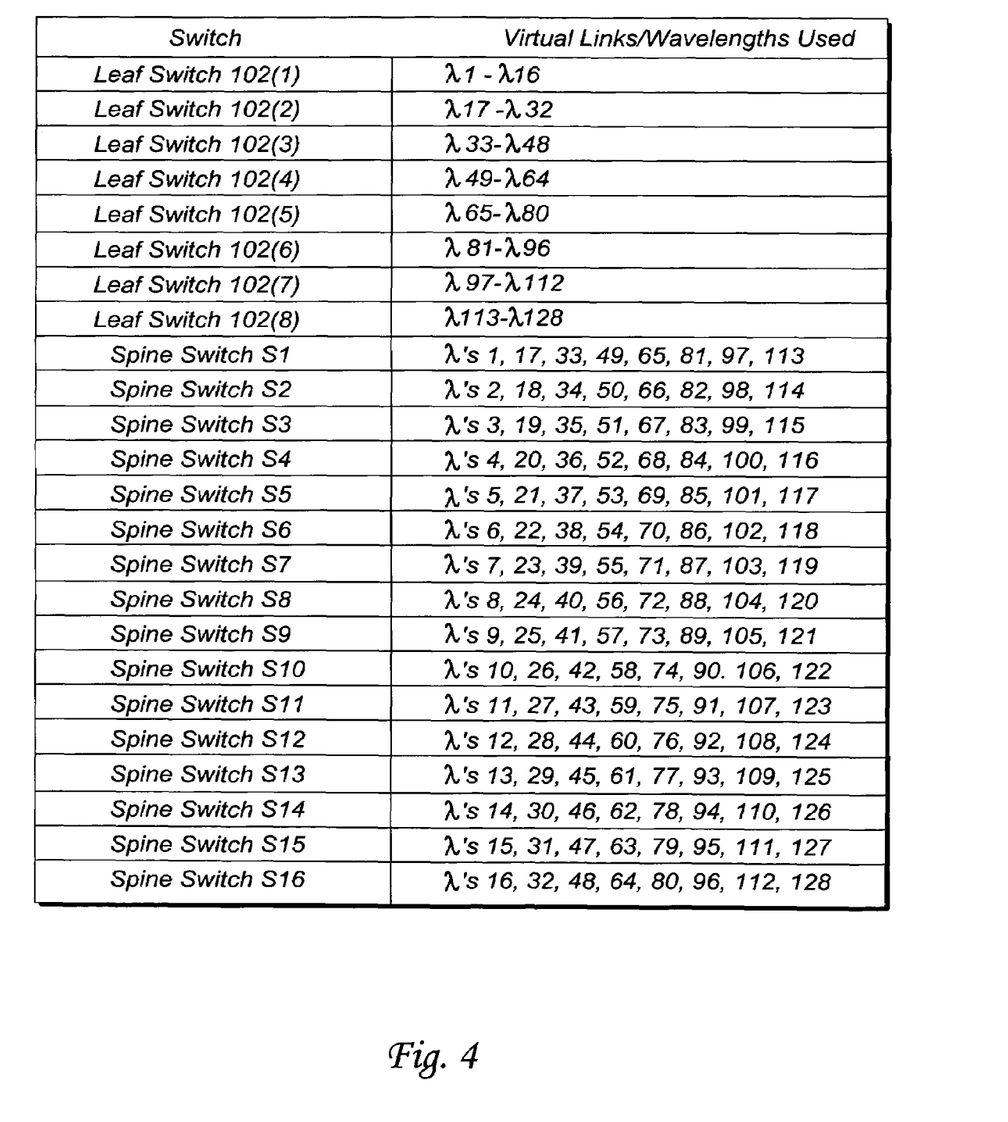
FIG. 4 shows a table summarizing the virtual links used by each switch in the network of FIG. 2, in accordance with one embodiment of the present invention.

That is, there is not a separate fiber in SCM 204 for connecting each switch port pair. Rather, connectivity between specific switches and ports is achieved through "virtual" links, which are implemented by way of wavelength division multiplexing (WDM). To illustrate how this can be done, let's replace each physical link (P) in the table of FIG. 3 with an optical wavelength (λ) (the result after replacement is shown in FIG. 4). Thus, instead of using physical links P1-P16, leaf switch 102(1) now uses wavelengths λ1-λ16. Similarly, instead of using physical links P's 1, 17, 33, 49, 65, 81, 97, 113, the spine switch S1 now uses wavelengths λ's 1, 17, 33, 49, 65, 81, 97, 113. These optical wavelengths λ now represent the virtual links that connect the various switches.

To establish these virtual links, the switches are configured to implement the various wavelengths. To illustrate how this can be done, reference will be made to an example. From FIG. 4, it can be seen that both leaf switch 102(1) and spine switch S1 use the wavelength λ1; thus, this wavelength λ1 represents the virtual link between the two switches 102(1) and S1. To establish this virtual link, one of the inner ports (assume the first inner port) of leaf switch 102(1) is configured to send information onto the SCM 204 using this wavelength λ1, and to receive information from the SCM 204 using this wavelength λ1. Similarly, one of the ports (assume the first port) of spine switch S1 is configured to send information onto the SCM 204 using this wavelength λ1, and to receive information from the SCM 204 using this wavelength λ1. Once that is done, leaf switch 102(1) and spine switch S1 will be able to exchange information using this wavelength λ1. No other switches in network 200 will use this wavelength λ1; thus, λ1 will serve as the unique virtual link between the first inner port of leaf switch 102(1) and the first port of spine switch S1.

Once this virtual link is established, the first inner port of leaf switch 102(1) can send information to the first port of spine switch S1 by sending information signals having the wavelength λ1 onto the SCM 204. As these information signals travel around the SCM 204, they are ignored by all of the switches except for spine switch S1. Because the first port of spine switch S1 has been configured to receive signals having this wavelength λ1, that port will receive the information signals and will process them. Information may be sent from the first port of spine switch S1 to the first inner port of leaf switch 102(1) in a similar fashion. Specifically, the first port of spine switch S1 sends information signals having the wavelength λ1 onto the SCM 204. As these information signals travel around the SCM 204, they are ignored by all of the switches except for leaf switch 102(1). Because the first inner port of leaf switch 102(1) has been configured to receive signals having this wavelength λ1, that port will receive the information signals and will process them. In the manner described above, the first inner port of leaf switch 102(1) and the first port of spine switch S1 use the wavelength λ1 as a virtual link to exchange information between them.

The above discussion shows how one pair of switch ports can be configured to implement a virtual link using an optical wavelength. The same procedure can be used to configure all of the other switch port pairs to implement all of the one hundred twenty eight virtual links using all of the one hundred twenty eight optical wavelengths. For example, a second inner port of leaf switch 102(1) and a first port of spine switch S2 may be configured to implement a virtual link using λ2, a third inner port of leaf switch 102(1) and a first port of spine switch S3 may be configured to implement a virtual link using λ3, and so forth. All of the switch port pairs between the inner ports of the leaf switches and the ports of the spine switches can be derived from the table of FIG. 4. Once these virtual links are established, the network 200 of FIG. 2 will have the same connectivity as the network of FIG. 1. The difference, though, is that the single SCM 204 of network 200 is much simpler and easier to manage than the interconnect 104 of network 100.

One of the implications of implementing one hundred twenty eight virtual links using one hundred twenty eight different optical wavelengths is that the SCM 204 needs to be able to support that many different wavelengths. This poses a practical limit on the number of virtual links that can be established. In most optical fibers today, it is possible to support only about eighty different optical wavelengths per fiber. With this limit, it may not even be possible to implement the single SCM 204 network shown in FIG. 2.

Multiple SCM Implementation with Multiple Coupled Subsets

Figure 5:
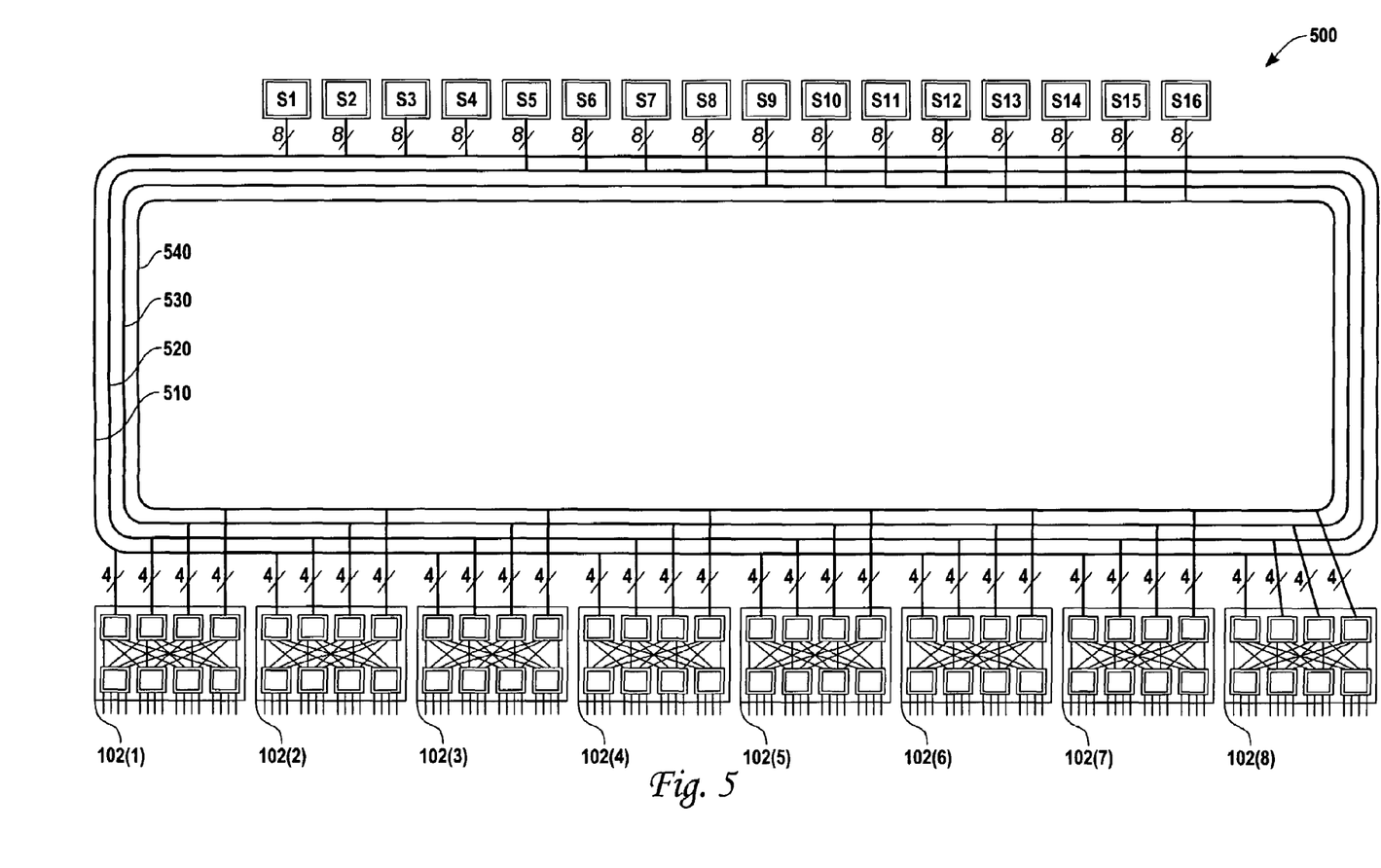
FIG. 5 shows a sample network in accordance with one embodiment of the present invention having multiple signal carrying media.

It has been observed by Applicants, however, that not all of the switch ports need to be coupled to the same SCM 204. Rather, upon further analysis of the interconnect 104 of FIG. 1, it is noticed that only certain subsets of switch ports need to be coupled to certain other subsets of switch ports. For example, it is noted from interconnect 104 that the first four inner ports of each leaf switch 102 are coupled to only the first four spine switches S1-S4. Likewise, the second four inner ports (ports 5 through 8) of each leaf switch 102 are coupled to only the second four spine switches S5-S8. Furthermore, the third four inner ports (ports 9 through 12) of each leaf switch 102 are coupled to only the third four spine switches S9-S12, and the fourth four inner ports (ports 13 through 16) of each leaf switch 102 are coupled to only the fourth four spine switches S13-S16. Given this observation, it is possible to group these subsets of switch ports together, and to couple them with separate SCM's. One possible implementation is shown in FIG. 5, wherein four separate SCM's 510, 520, 530, and 540 are used to provide the physical media needed to couple the various subsets of switching ports. For purposes of the present invention, the SCM's 510, 520, 530, 540 may take on any form, but in one embodiment, each SCM is implemented as a set of one or more optical fiber rings. As shown in FIG. 5, the first four inner ports of each leaf switch 102 and the first four spine switches S1-S4 are selected and coupled to SCM 510. The second four inner ports (ports 5 through 8) of each leaf switch 102 and the second four spine switches S5-S8 are selected and coupled to SCM 520. The third four inner ports (ports 9 through 12) of each leaf switch 102 and the third four spine switches S9-S12 are selected and coupled to SCM 530. Finally, the fourth four inner ports (ports 13 through 16) of each leaf switch 102 and the fourth four spine switches S13-S16 are selected and coupled to SCM 540. With this coupling arrangement, it is possible to achieve the same connectivity as that provided by the single SCM arrangement shown in FIG. 2.

Given this coupling arrangement, the optical wavelengths supported by each SCM would be as follows. Using the same λ numbering scheme as that shown in the table of FIG. 4, SCM 510 would support λ's 1-4, 17-20, 33-36, 49-52, 65-68, 81-84, 97-100, and 113-116 (these are the first four optical wavelengths used by each leaf node 102). SCM 520 would support λ's 5-8, 21-24, 37-40, 53-56, 69-72, 85-88, 101-104, and 117-120 (these are the second four optical wavelengths used by each leaf node 102). SCM 530 would support λ's 9-12, 25-28, 41-44, 57-60, 73-76, 89-92, 105-

108, and 121-124 (these are the third four optical wavelengths used by each leaf node 102), and SCM 540 would support λ's 13-16, 29-32, 45-48, 61-64, 77-80, 93-96, 109-112, and 125-128 (these are the fourth four optical wavelengths used by each leaf node 102). Notice that, by selecting and coupling just a subset of the inner ports of each leaf switch and a subset of the spine switches to each SCM 510, 520, 530, 540, it is possible to significantly reduce the number of optical wavelengths that each SCM has to support. In the arrangement shown in FIG. 5, each SCM 510, 520, 530, 540 now has to support only thirty two different optical wavelengths rather than the entire one hundred twenty eight optical wavelengths that the single SCM 204 of FIG. 2 had to support. Thus, by grouping the inner ports of the leaf switches and the spine switches into subsets, and by coupling these subsets to separate SCM's, it is possible to use regular optical fiber rings (which can support approximately eighty different optical wavelengths) to provide the connectivity needed by the network 500.

Another advantage of grouping the inner ports of the leaf switches and the spine switches into subsets and coupling each subset to a separate SCM is that it enhances the scalability of the network 500. To accommodate more switches and ports, more SCM's may be added. Many more switches, ports, and SCM's may be added to the network 500 before the maximum number of wavelengths supported by each SCM is reached. Thus, with the multiple SCM arrangement of FIG. 5, it is possible to achieve much larger networks than the single SCM arrangement shown in FIG. 2.

In the network 500 of FIG. 5, each SCM 510, 520, 530, 540 is separate and distinct. That being the case, each SCM may support any set of desired wavelengths. Put another way, there need not be any relationship between the wavelengths supported on one SCM and the wavelengths supported on another SCM. For example, the optical wavelengths λ's 1-4, 17-20, 33-36, 49-52, 65-68, 81-84, 97-100, and 113-116 supported by SCM 510 may be the same actual wavelengths as the optical wavelengths λ's 5-8, 21-24, 37-40, 53-56, 69-72, 85-88, 101-104, and 117-120 supported by SCM 520, or they may be different wavelengths, or some of the wavelengths may be the same while others are different. Unlike the single SCM case of FIG. 2 in which every one of the one hundred twenty eight wavelengths had to be different, the wavelengths in the different SCM's 510, 520, 530, 540 of FIG. 5 may overlap. So long as none of the λ's within the same SCM are the same wavelength, the network 500 will operate properly.

Establishment of Virtual Links

In order to achieve in network 500 the same connectivity as that provided by the network 100 of FIG. 1, the various switch ports need to be configured to establish the various virtual links. These virtual links may be established in the same manner as that described above for the single SCM network 200 of FIG. 2. From a switch port configuration perspective, there is no difference between the multiple SCM arrangement of FIG. 5 and the single SCM arrangement of FIG. 2.

Figure 6:
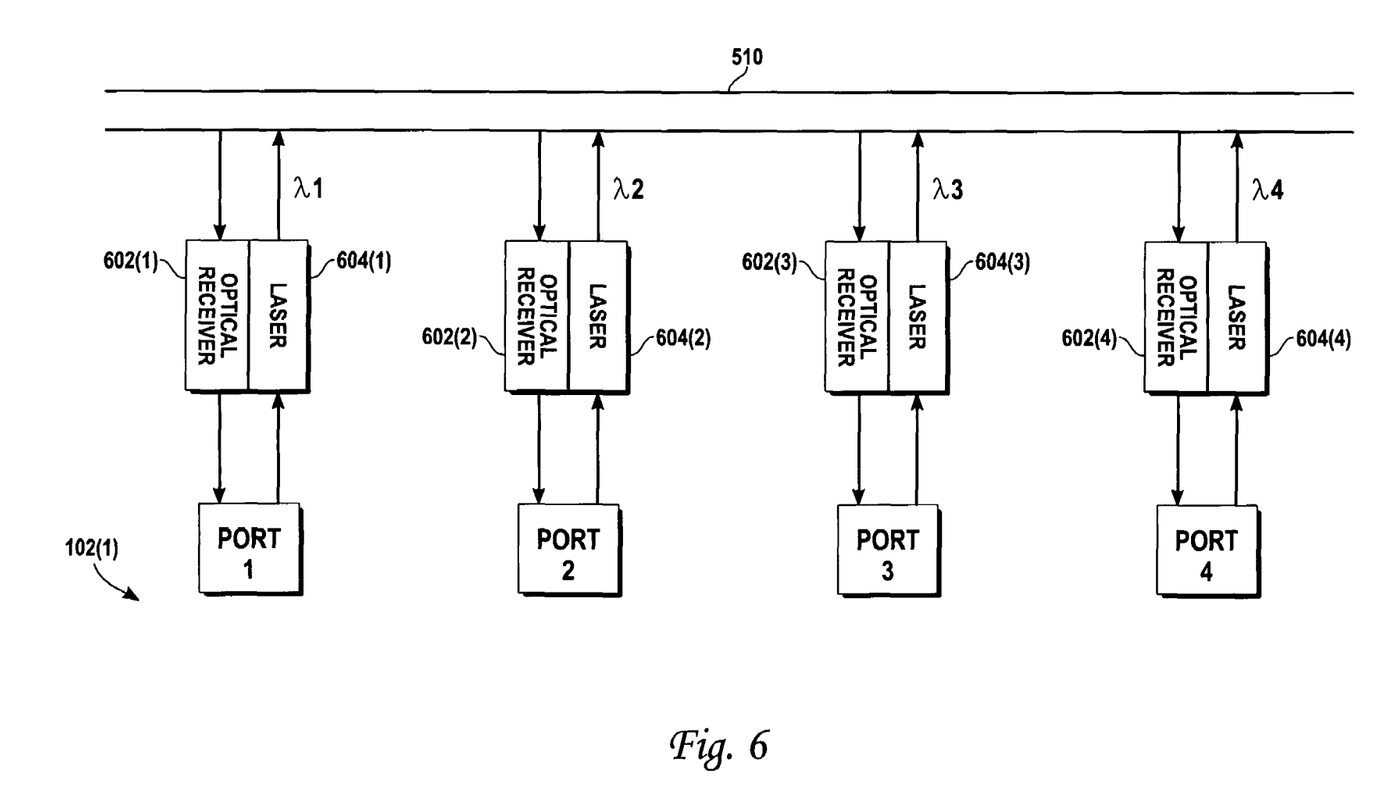
FIG. 6 shows a functional block diagram of several ports of a leaf switch, configured to implement virtual links in accordance with one embodiment of the present invention.

To illustrate how switch ports may be configured in accordance with one embodiment of the present invention to establish virtual links, reference will now be made to several examples. FIG. 6 shows a functional block diagram of the first four ports of leaf switch 102(1). As noted previously, these four ports are coupled to SCM 510. As shown in the table of FIG. 4, leaf switch 102(1) uses λ's 1-16; thus, for the sake of example, it will be assumed that the first four ports of leaf switch 102(1) use λ's 1-4, respectively.

In one embodiment, to configure port 1 to support λ1, an optical receiver 602(1) and a laser 604(1) are placed between port 1 and the SCM 510. The purpose of the optical receiver 602(1) is to extract from the SCM 510 all optical signals having the optical wavelength λ1. The optical receiver 602(1) will filter out all other optical wavelengths. When optical signals having the optical wavelength λ1 are detected by the optical receiver 602(1), they are converted by the optical receiver 602(1) into electrical signals, which are then provided to port 1. Leaf switch 102(1) thereafter processes and switches these electrical signals to another port, in the regular manner. In one embodiment, the optical receiver 602(1) may be a tunable receiver that is tuned to optical wavelength λ1, or it may be a receiver that is specifically constructed to extract signals having the optical wavelength λ1. The laser 604(1) serves the inverse purpose. Its function is to receive electrical signals from port 1, transform them into optical signals having optical wavelength λ1, and to send the optical signals onto SCM 510. Basically, the receiver 602(1) allows port 1 to receive information, and the laser 604(1) allows port 1 to send information. In one embodiment, the laser 604(1) may be a tunable laser that is tuned to output optical signals having optical wavelength λ1, or it may be a laser that is specifically constructed to output optical signals having the optical wavelength λ1. By configuring port 1 in the above manner, port 1 can be made to support optical wavelength λ1, and hence, the virtual link represented by λ1. Ports 2-4 may be configured in a similar manner to support λ's 2-4, respectively. All of the inner ports of all of the leaf switches 102 may be configured in this way to enable them to support the proper optical wavelengths, and hence, the proper virtual links. The table of FIG. 4 shows the λ's that the inner ports of the leaf switches 102 should be configured to support. Thus, for example, inner ports 1-16 of leaf switch 102(1) should be configured to support λ's 1-16, inner ports 1-16 of leaf switch 102(2) should be configured to support λ's 17-32, inner ports 1-16 of leaf switch 102(3) should be configured to support λ's 33-48, and so forth.

Figure 7:
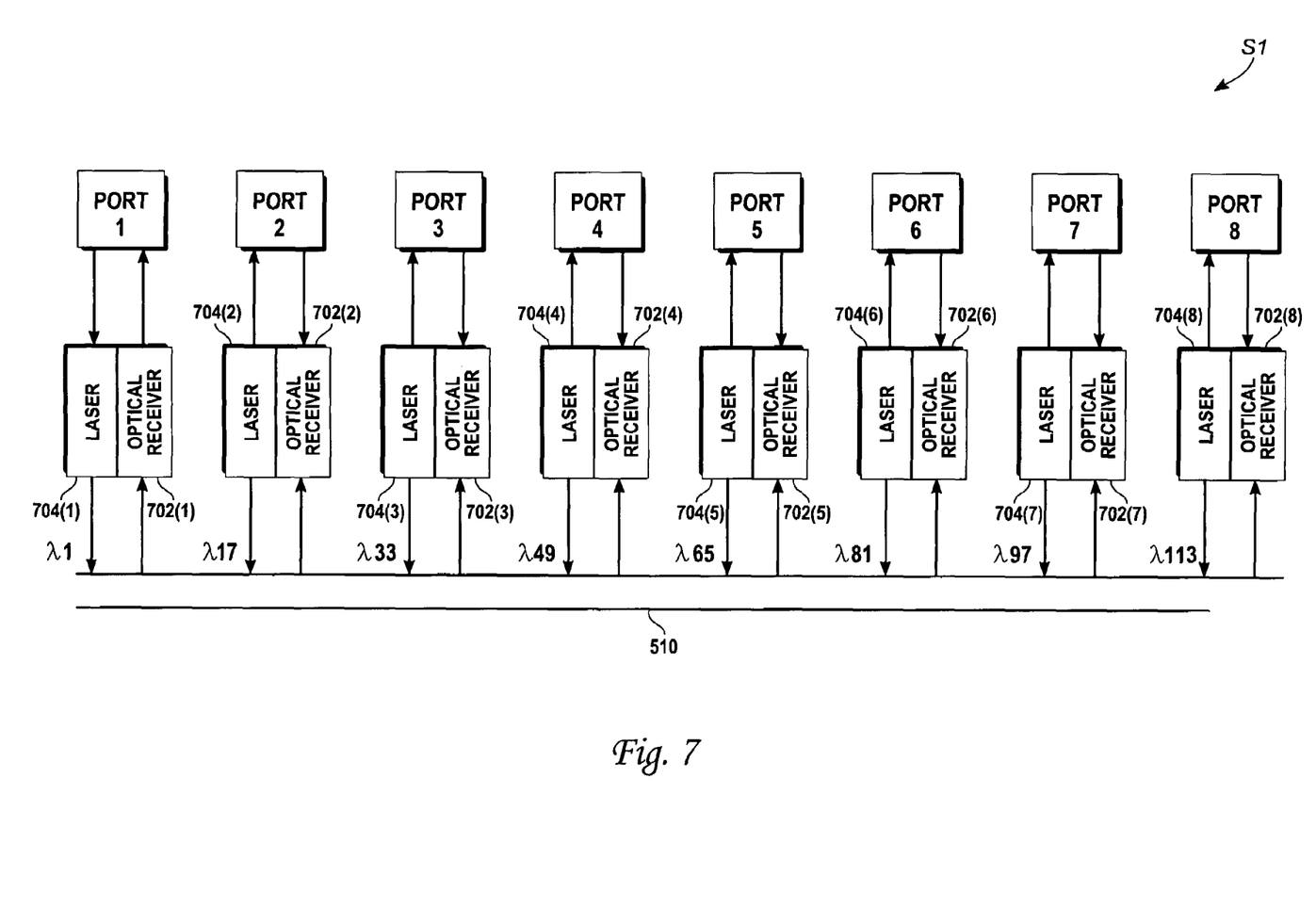
FIG. 7 shows a functional block diagram of the ports of a spine switch, configured to implement virtual links in accordance with one embodiment of the present invention.

The ports of the spine switches S1-S16 may be configured in much the same manner. To illustrate, reference will be made to FIG. 7, which shows a functional block diagram of the eight ports of the spine switch S1. As noted previously, spine switch S1 is coupled to SCM 510. As shown in the table of FIG. 4, spine switch S1 uses the optical wavelengths λ's 1, 17, 33, 49, 65, 81, 97, and 113.

To configure port 1 to support λ1, an optical receiver 702(1) and a laser 704(1) are placed between port 1 and the SCM 510. The purpose of the optical receiver 702(1) is to extract from the SCM 510 all optical signals having the optical wavelength λ1. The optical receiver 702(1) will filter out all other optical wavelengths. When optical signals having the optical wavelength λ1 are detected by the optical receiver 702(1), they are converted by the optical receiver 702(1) into electrical signals, which are then provided to port 1. Spine switch S1 thereafter processes and switches these electrical signals to another port, in the regular manner. In one embodiment, the optical receiver 702(1) may be a tunable receiver that is tuned to optical wavelength λ1, or it may be a receiver that is specifically constructed to extract signals having the optical wavelength λ1. The laser 704(1) serves the inverse purpose. Its function is to receive electrical signals from port 1, transform them into optical signals having optical wavelength λ1, and to send the optical signals onto SCM 510. Basically, the receiver 702(1) allows port 1 to receive information, and the laser 704(1) allows port 1 to send information. In one embodiment, the laser 704(1) may be a tunable laser that is tuned to output optical signals having optical wavelength λ1, or it may be a laser that is specifically constructed to output optical signals having the optical wavelength λ1. By configuring port 1 in the above manner, port 1 can be made to support optical wavelength λ1, and hence, the virtual link represented by λ1. Once port 1 is configured in this manner, the first port of spine switch S1 will be able to exchange information with the first port of leaf switch 102(1) (see FIG. 6) using λ1 as the virtual link. Ports 2-8 of the spine switch S1 may be configured in a similar manner to support λ's 17, 33, 49, 65, 81, 97, and 113, respectively. All of the ports of all of spine switches S1-S16 may be configured in this way to enable them to support the proper optical wavelengths, and hence, the proper virtual links. The table of FIG. 4 shows the λ's that the ports of the spine switches S1-S16 should be configured to support. Thus, for example, ports 1-8 of spine switch S2 should be configured to support λ's 2, 18, 34, 50, 66, 82, 98, and 114, ports 1-8 of spine switch S2 should be configured to support λ's 3, 19, 35, 51, 67, 83, 99, and 115, ports 1-8 of spine switch S3 should be configured to support λ's 4, 20, 36, 52, 68, 84, 100, and 116, and so forth. After all of the leaf switches 102 and spine switches S1-S16 are configured to support the proper optical wavelengths, the network 500 of FIG. 5 will have the same connectivity as the network 100 of FIG. 1. This connectivity is achieved with a much simpler infrastructure (four SCM's) than the interconnect 104 of FIG. 1.

Alternative Embodiments

In the description provided above, reference is made to a network having sixteen eight-port spine switches and eight sixteen-port leaf switches. It should be noted that such a network is disclosed for illustrative purposes only. The present invention is not so limited. Rather, the concepts taught herein may be applied generally to other networks having more or fewer spine switches, more or fewer leaf switches, more or fewer ports per switch, etc. All such implementations are within the scope of the present invention.

At this point, it should be noted that although the invention has been described with reference to one or more specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A network, comprising:
a plurality of spine switch ports;
a plurality of leaf switch ports;
a first signal carrying medium (SCM) coupled to a first subset of the spine switch ports and a first subset of the leaf switch ports, wherein the first SCM comprises a first set of one or more optical medium rings; and
a second SCM coupled to a second subset of the spine switch ports and a second subset of the leaf switch ports, wherein the second SCM comprises a second set of one or more optical medium rings distinct from the first set of optical medium rings;
wherein the first subset of spine switch ports and the first subset of leaf switch ports are configured to establish a first plurality of virtual links between the first subset of spine switch ports and the first subset of leaf switch ports, wherein the first SCM supports a first plurality of optical wavelengths, and wherein each of the first plurality of optical wavelengths is assigned to one of the first plurality of virtual links to carry information for that virtual link; and
wherein the second subset of spine switch ports and the second subset of leaf switch ports are configured to establish a second plurality of virtual links between the second subset of spine switch ports and the second subset of leaf switch ports, wherein the second SCM supports a second plurality of optical wavelengths, and wherein each of the second plurality of optical wavelengths is assigned to one of the second plurality of virtual links to carry information for that virtual link.

2. The network of claim 1, wherein the first subset of spine switch ports and the second subset of spine switch ports are distinct subsets, and wherein the first subset of leaf switch ports and the second subset of leaf switch ports are distinct subsets.

3. The network of claim 2, wherein the first plurality of optical wavelengths and the second plurality of optical wavelengths are the same wavelengths.

4. The network of claim 2, wherein the first plurality of optical wavelengths and the second plurality of optical wavelengths are different wavelengths.

5. The network of claim 1, wherein each spine switch port in the first subset of spine switch ports supports one of the first plurality of virtual links, and hence, one of the first plurality of optical wavelengths, and wherein each spine switch port in the first subset of spine switch ports comprises an optical receiver for receiving optical signals having the optical wavelength that that spine switch port supports, and a laser for outputting optical signals having the optical wavelength that that spine switch port supports.

6. The network of claim 5, wherein each leaf switch port in the first subset of leaf switch ports supports one of the first plurality of virtual links, and hence, one of the first plurality of optical wavelengths, and wherein each leaf switch port in the first subset of leaf switch ports comprises an optical receiver for receiving optical signals having the optical wavelength that that leaf switch port supports, and a laser for generating optical signals having the optical wavelength that that leaf switch port supports.

7. The network of claim 1, wherein each of the spine switch ports in the first subset of spine switch ports supports a separate virtual link to one of the leaf switch ports in the first subset of leaf switch ports, and wherein each of these separate virtual links is associated with a distinct one of the optical wavelengths in the first plurality of optical wavelengths such that none of the separate virtual links have the same optical wavelength associated therewith.

8. The network of claim 1, further comprising:
a third SCM coupled to a third subset of the spine switch ports and a third subset of the leaf switch ports; and
a fourth SCM coupled to a fourth subset of the spine switch ports and a fourth subset of the leaf switch ports;
wherein the third subset of spine switch ports and the third subset of leaf switch ports are configured to establish a third plurality of virtual links between the third subset of spine switch ports and the third subset of leaf switch ports, wherein the third SCM supports a third plurality of optical wavelengths, and wherein each of the third plurality of optical wavelengths is assigned to one of the third plurality of virtual links to carry information for that virtual link; and wherein the fourth subset of spine switch ports and the fourth subset of leaf switch ports are configured to establish a fourth plurality of virtual links between the fourth subset of spine switch ports and the fourth subset of leaf switch ports, wherein the fourth SCM supports a fourth plurality of optical wavelengths, and wherein each of the fourth plurality of optical wavelengths is assigned to one of the fourth plurality of virtual links to carry information for that virtual link.

9. The network of claim 8, wherein the first subset of spine switch ports, the second subset of spine switch ports, the third subset of spine switch ports, and the fourth subset of spine switch ports are all distinct subsets, and wherein the first subset of leaf switch ports, the second subset of leaf switch ports, the third subset of leaf switch ports, and the fourth subset of leaf switch ports are all distinct subsets.

10. The network of claim 9, wherein the third SCM comprises a third set of one or more optical medium rings, wherein the fourth SCM comprises a fourth set of one or more optical medium rings, and wherein the first, second, third, and fourth sets of optical medium rings are distinct from each other.

11. The network of claim 10, wherein the first set of one or more optical medium rings comprises a first set of one or more optical fiber rings, wherein the second set of one or more optical medium rings comprises a second set of one or more optical fiber rings, wherein the third set of one or more optical medium rings comprises a third set of one or more optical fiber rings, and wherein the fourth set of one or more optical medium rings comprises a fourth set of one or more optical fiber rings.

12. The network of claim 1, wherein the first set of one or more optical medium rings comprises a first set of one or more optical fiber rings, and wherein the second set of one or more optical medium rings comprises a second set of one or more optical fiber rings.

13. A method for establishing a network, comprising:
selecting, from a plurality of spine switch ports, a first subset of spine switch ports;
selecting, from a plurality of leaf switch ports, a first subset of leaf switch ports;
coupling the first subset of spine switch ports and the first subset of leaf switch ports to a first signal carrying medium (SCM), wherein the first SCM comprises a first set of one or more optical medium rings;
selecting, from the plurality of spine switch ports, a second subset of spine switch ports;
selecting, from the plurality of leaf switch ports, a second subset of leaf switch ports;
coupling the second subset of spine switch ports and the second subset of leaf switch ports to a second SCM, wherein the second SCM comprises a second set of one or more optical medium rings distinct from the first set of optical medium rings;
configuring the first subset of spine switch ports and the first subset of leaf switch ports to establish a first plurality of virtual links between the first subset of spine switch ports and the first subset of leaf switch ports, wherein the first SCM supports a first plurality of optical wavelengths, and wherein the first subset of spine switch ports and the first subset of leaf switch ports are configured to use the first plurality of optical wavelengths to carry information on the first plurality of virtual links; and
configuring the second subset of spine switch ports and the second subset of leaf switch ports to establish a second plurality of virtual links between the second subset of spine switch ports and the second subset of leaf switch ports, wherein the second SCM supports a second plurality of optical wavelengths, and wherein the second subset of spine switch ports and the second subset of leaf switch ports are configured to use the second plurality of optical wavelengths to carry information on the second plurality of virtual links.

14. The method of claim 13, wherein configuring the first subset of spine switch ports and the first subset of leaf switch ports to establish the first plurality of virtual links comprises:
selecting a particular spine switch port from the first subset of spine switch ports;
selecting a particular optical wavelength from the first plurality of optical wavelengths; and
configuring the particular spine switch port to: (a) receive optical signals having the particular optical wavelength from the first SCM; and (b) send optical signals having the particular optical wavelength onto the first SCM.

15. The method of claim 14, wherein configuring the first subset of spine switch ports and the first subset of leaf switch ports to establish the first plurality of virtual links further comprises:
selecting a particular leaf switch port from the first subset of leaf switch ports;
selecting the particular optical wavelength from the first plurality of optical wavelengths; and
configuring the particular leaf switch port to: (a) receive optical signals having the particular optical wavelength from the first SCM; and (b) send optical signals having the particular optical wavelength onto the first SCM, thereby establishing a particular virtual link between the particular spine switch port and the particular leaf switch port that uses the particular optical wavelength to exchange information.

16. The method of claim 15, wherein the particular optical wavelength is not used by any other spine switch port in the first subset of spine switch ports or any other leaf switch port in the first subset of leaf switch ports to exchange information.

17. The method of claim 13, wherein the first subset of spine switch ports and the second subset of spine switch ports are distinct subsets, and wherein the first subset of leaf switch ports and the second subset of leaf switch ports are distinct subsets.

18. The method of claim 17, wherein the first plurality of optical wavelengths and the second plurality of optical wavelengths are the same wavelengths.

19. The method of claim 17, wherein the first plurality of optical wavelengths and the second plurality of optical wavelengths are different wavelengths.

20. The method of claim 13, further comprising:
selecting, from the plurality of spine switch ports, a third subset of spine switch ports;
selecting, from the plurality of leaf switch ports, a third subset of leaf switch ports;
coupling the third subset of spine switch ports and the third subset of leaf switch ports to a third signal carrying medium (SCM);
selecting, from the plurality of spine switch ports, a fourth subset of spine switch ports;
selecting, from the plurality of leaf switch ports, a fourth subset of leaf switch ports;
coupling the fourth subset of spine switch ports and the fourth subset of leaf switch ports to a fourth SCM;
configuring the third subset of spine switch ports and the third subset of leaf switch ports to establish a third plurality of virtual links between the third subset of spine switch ports and the third subset of leaf switch ports, wherein the third SCM supports a third plurality of optical wavelengths, and wherein the third subset of spine switch ports and the third subset of leaf switch ports are configured to use the third plurality of optical wavelengths to carry information on the third plurality of virtual links; and configuring the fourth subset of spine switch ports and the fourth subset of leaf switch ports to establish a fourth plurality of virtual links between the fourth subset of spine switch ports and the fourth subset of leaf switch ports, wherein the fourth SCM supports a fourth plurality of optical wavelengths, and wherein the fourth subset of spine switch ports and the fourth subset of leaf switch ports are configured to use the fourth plurality of optical wavelengths to carry information on the fourth plurality of virtual links.

21. The method of claim 20, wherein the first subset of spine switch ports, the second subset of spine switch ports, the third subset of spine switch ports, and the fourth subset of spine switch ports are all distinct subsets, and wherein the first subset of leaf switch ports, the second subset of leaf switch ports, the third subset of leaf switch ports, and the fourth subset of leaf switch ports are all distinct subsets.

22. The method of claim 21, wherein the third SCM comprises a third set of one or more optical medium rings, wherein the fourth SCM comprises a fourth set of one or more optical medium rings, and wherein the first, second, third, and fourth sets of optical medium rings are distinct from each other.

23. The method of claim 22, wherein the first set of one or more optical medium rings comprises a first set of one or more optical fiber rings, wherein the second set of one or more optical medium rings comprises a second set of one or more optical fiber rings, wherein the third set of one or more optical medium rings comprises a third set of one or more optical fiber rings, and wherein the fourth set of one or more optical medium rings comprises a fourth set of one or more optical fiber rings.

24. The method of claim 13, wherein the first set of one or more optical medium rings comprises a first set of one or more optical fiber rings, and wherein the second set of one or more optical medium rings comprises a second set of one or more optical fiber rings.

* * * * *